United States Patent [19]

Kent et al.

[11] Patent Number: 4,967,857
[45] Date of Patent: Nov. 6, 1990

[54] WEIGHING APPARATUS

[75] Inventors: Graham Kent, Almondsbury; John S. Stoddart, Harpenden, both of United Kingdom

[73] Assignee: The Post Office, London, United Kingdom

[21] Appl. No.: 296,531

[22] Filed: Jan. 12, 1989

[30] Foreign Application Priority Data

Jan. 13, 1988 [GB] United Kingdom ............. 8800717

[51] Int. Cl.⁵ .................. G01G 19/00; G01G 19/52
[52] U.S. Cl. ................................ 177/145; 177/50
[58] Field of Search .............................. 177/145, 50

[56] References Cited

U.S. PATENT DOCUMENTS

| | | | |
|---|---|---|---|
| 3,545,611 | 12/1970 | Husome | 177/145 X |
| 4,321,439 | 11/1980 | Hall, Jr. et al. | 177/50 |

FOREIGN PATENT DOCUMENTS

| | | | |
|---|---|---|---|
| 44731 | 1/1982 | European Pat. Off. | |
| 283388 | 9/1988 | European Pat. Off. | |
| 761842 | 7/1980 | U.S.S.R. | 177/145 |
| 855899 | 3/1958 | United Kingdom | |
| 1088088 | 10/1967 | United Kingdom | |
| 1216651 | 12/1970 | United Kingdom | |
| 2026176 | 1/1980 | United Kingdom | |
| 1579584 | 11/1980 | United Kingdom | |
| 1600511 | 10/1981 | United Kingdom | |
| 2111693 | 7/1983 | United Kingdom | |

Primary Examiner—George H. Miller, Jr.
Attorney, Agent, or Firm—Merchant, Gould, Smith, Edell, Welter & Schmidt

[57] ABSTRACT

A weighing arrangement comprises a conveyor system defining a path for articles and including a first feed conveyor, a second upwardly inclined conveyor arranged to receive articles from the first conveyor and a third, downwardly inclined conveyor. The first and second conveyors have respective first and second motors for independent drive.

The weighing apparatus has a weight measuring component in the form of a rotatable cylinder which cooperates with load sensing means.

In use, an article is fed from the conveyor to the cylinder of the weighing apparatus. Operation of the weighing apparatus is based on the principle that as the article changes direction to be discharged via the downward conveyor there is an instant at which the total mass of the article passes through its center of gravity so as to act directly downwardly via the cylinder on the load sensing means.

11 Claims, 5 Drawing Sheets

WEIGHING APPARATUS

FIELD OF THE INVENTION

The present invention relates to weighing apparatus.

BACKGROUND OF THE INVENTION

There are many circumstances where it is desirable to measure the weights of articles in transit from one location to another. In many cases, such articles are carried by a conveyor system between the two locations. At present, in order to measure the weight of one of the articles it is necessary to transfer that article to a weighing system. In one arrangement, this entails either stopping the conveyor system while the article is transferred to a stationary weighing system. In another arrangement pushers and auxiliary conveyors are used so that the article can be transferred to a weighing system without stopping the main conveyor system. The article whose weight is to be measured will then normally be returned to the main conveyor system or to a further conveyor system for transit to the other location. In these known types of weighing systems, a delay in the transfer of articles between the locations is unavoidable. Further, transfer mechanisms for transferring the article whose weight is to be measured from the main conveyor system to a weighing system must be provided. This has the consequence that it is often not practicable to measure the weight of each of a plurality of articles being transferred in succession, except in cases where the inherent delays can be tolerated.

The present invention was developed to overcome this problem specifically in relation to the measurement of parcel weights in Post Office sorting systems and to provide a weighing apparatus capable of measuring weights of a plurality of parcels being transferred in succession between two locations, without excessive delays. However, the present invention is applicable to measuring the weights of any articles, and is particularly suitable for rigid and semi-rigid articles.

SUMMARY OF THE INVENTION

According to one aspect of the present invention there is provided a weighing arrangement comprising:

a conveyor incorporating a load bearing component arranged in the path of an article on the conveyor system, the load bearing component being arranged to balance the article as it passes over the load bearing component so that substantially the total weight of the article momentarily acts on the load bearing component; and load sensing means coupled to the load bearing component for measuring said total weight.

According to another aspect of the present invention there is provided a method of weighing an article in a conveyor system the method comprising the steps of supplying an article to the conveyor system;

driving said conveyor system to cause said article to travel to a load bearing component arranged to receive such articles and to balance such articles as they pass over the load bearing component so that substantially the total weight of the article momentarily acts on the load bearing component; and measuring said total weight.

With this arrangement, the weight of an article can be measured 'on the fly', that is without pause for detection.

In the preferred embodiment, the weight measuring component comprises a cylindrical body mounted for rotation about an axis thereof. A shaft extending along said axis is rotatably mounted between two facing side pieces of a frame which is secured to a support member in such a way that the frame can pivot relative to the support member about an axis extending parallel to said axis of rotation.

While it is possible to arrange for the cylindrical body to "freewheel" about the axis of rotation this may not give rise to the best possible accuracy in weight measurement. With a "freewheel" arrangement, the point of change of direction of the article is outside the control of the system. In some cases the article may slip over the cylindrical body, giving rise to friction and consequent reaction forces. In other cases, the article may "teeter" on the surface of the cylindrical body before moving onto the discharge portion or possibly even stall at the end of the supply portion. It has been found during tests of the preferred embodiment of the invention that accuracy in measuring the weight of an article depends on measuring the weight when the centre of gravity of the article is acting on the load sensing means: this occurs as the article changes direction or tilts between the supply and discharge portions since there is then a point at which the total weight of the article acts through its centre of gravity on the load sensing means. This point will be referred to hereinafter as the "point of inflexion". In order to ensure that the point of inflexion is as well defined as possible, it is preferable to provide the cylindrical body with drive means for causing rotation about said axis. This has the additional advantage that forward movement of the articles along the path is not affected.

It is desirable to drive the body at a rotational rate such that the speed of its surface is approximately equal to the surface speed of the supply portion. This ensures a smooth longitudinal transition of the article and avoids the occurrence of frictional force differentials which may occur if the articles are fed from the supply portion at a greater or lesser speed than the surface speed of the weight measuring component. Such differentials could give rise to reactive forces having a vertical component which may adversely affect the accuracy of the weight measurement.

Preferably, circuitry is provided for the load sensing means to measure the peak weight value, which is an accurate measure of the total weight of the article. This compares favourably with known weighing bridges and the like where a part of the article is weighed and an integration performed to provide an estimate of the full weight of the article.

Embodiments of the invention are particularly suitable for the dynamic weighing of random weight and size parcels/packages as may occur at the infeed of a sorting/collection machine. In such a case, a fast throughput of articles is required but an extremely accurate weight is not necessary. For example, one application could be parcel intake from a mail order business to provide tariff-negotiation data and statistics if each parcel weight is individually logged.

The weighing arrangement can include a feed conveyor for regulating supply of the articles to the upwardly inclined portion of the conveyor system.

The weight measuring component and the upwardly inclined portion can be driven separately so as to avoid varying belt tension at the point of transfer, which might induce weighing inaccuracies.

The circuitry provided to assess when the peak weight has been sensed by the load sensing means can also be arranged to initiate, in response to this, feeding of the next article from the feed conveyor to the upwardly inclined portion.

For a better understanding of the present invention, and to show how the same may be carried into effect, reference will now be made, by way of example, to the accompanying drawings in which.

DESCRIPTION OF THE PREFERRED EMBODIMENT

Figure 1:
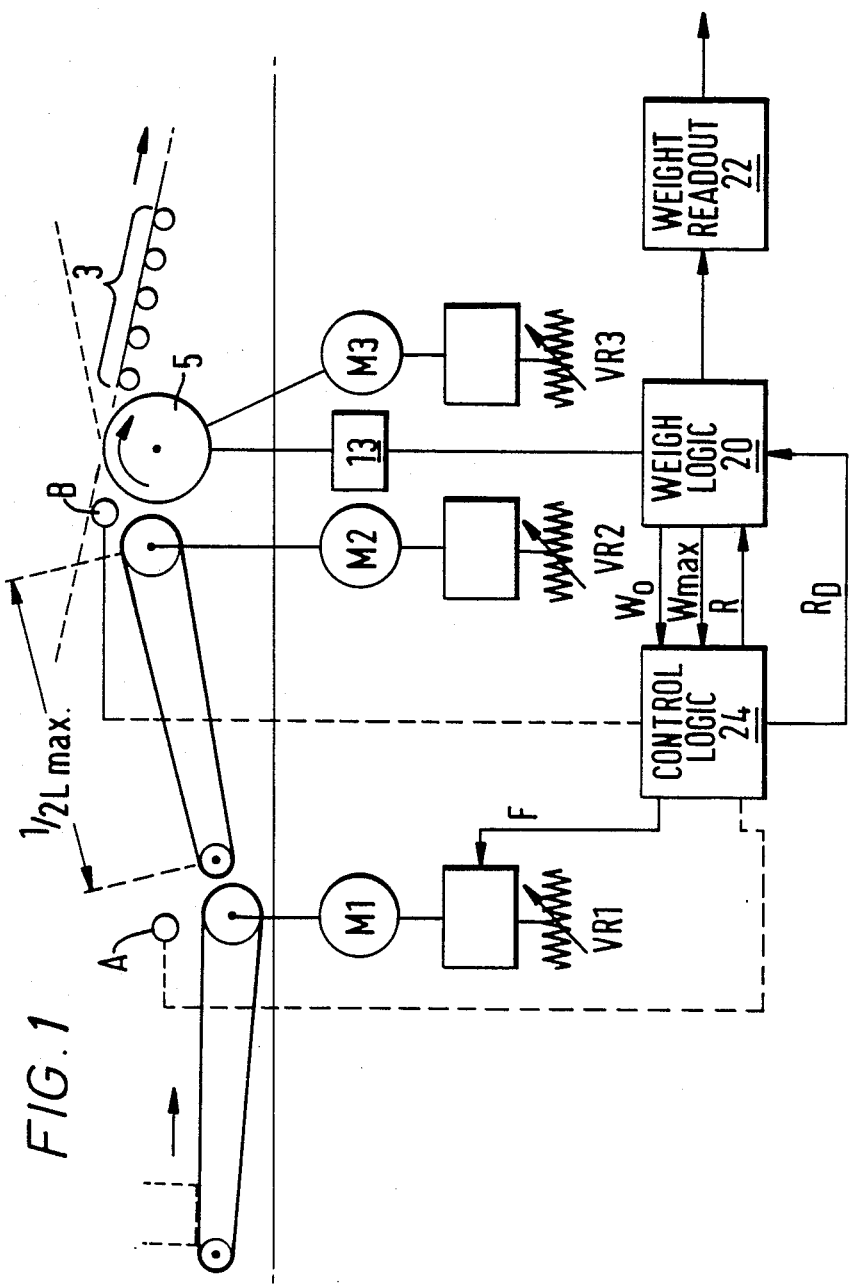
FIG. 1 is a diagram of a weighing system showing the inter-relationship between mechanical and electrical components.

Referring to FIG. 1, a weighing arrangement comprises a conveyor system defining a path for articles and including a first, feed conveyor 1, a second upwardly inclined conveyor 2 arranged to receive articles from the first conveyor 1 and a third, downwardly inclined conveyor 3. The first and second conveyors have respective first and second motors M1, M2 for independent drive, the speed being infinitely adjustable by electronic regulation (not shown). The first conveyor is generally driven at a lower surface speed than the second conveyor 2 to ensure a separation between articles. The third conveyor 3 comprises a plurality of rotatable rollers 4 which permit an article to roll down under the force of gravity. Articles are supplied from the second conveyor 2 to a weighing apparatus 5 (illustrated only diagrammatically in FIG. 1) which is driven by a third motor M3.

The weighing arrangement includes control circuitry for controlling the drive arrangements (motors M1, M2, M3) for the first and second conveyors and for the weighing apparatus so as to facilitate smooth flow of articles through the system. The motors M1, M2 and M3 are adjustably controllable, indicated diagrammatically by the variable resistors VR1, VR2 and VR3. The weighing apparatus has a weight measuring component (to be described) which cooperates with load sensing means 13. The latter supplies a signal to a weigh logic circuit 20 which includes an analogue peak detector and associated circuitry for defining the maximum weight Wmax detected by the load cell 13 and the zero weight (that is with the cylinder unloaded) Wo. The maximum weight W max is fed to a weight readout 22, preferably comprising a digital display. The maximum weight W max and the zero weight Wo are also fed to control logic 24 which controls starting and stopping of the first conveyor 1. It would be possible to feed signals from the load cell directly to a microprocessor for signal processing under software control. In this way, the logging of successive weights with time and other details may be conveniently incorporated for subsequent analysis. The control logic 24 receives a signal from the first conveyor 1 to indicate that an article is waiting. This is denoted at A in FIG. 1 and may be implemented in practice by an infra red sensor at the end of the first conveyor 1. The control logic 24 also receives a signal to indicate that an article is passing over the weighing apparatus 5, as is indicated at B in FIG. 1. This signal can be provided by a photoelectric transmit/detect arrangement which produces a beam parallel to and in close proximity to the conveying plane near the weighing apparatus. This signal assists in defining the point of inflexion of an article by detecting it just as its trailing edge lifts off the first conveyor 1 but before W max occurs. In this way, spurious W max signals are prevented. However, it has been found that, while the signal B assists in determining the point of inflexion of the article, it is not always necessary and can be set permanently at logic value 1. The control logic 24 generates a feed signal, designated F in FIG. 1, to control the motor M1 for the first conveyor 1. It also supplies (a) a reset signal, designated R in FIG. 1, for resetting the detection circuit in the weigh logic circuit 20 after each weight reading in readiness for the next article, and (b) a read signal RD for causing the detected weight to be read by the weight readout 22.

Figure 2:
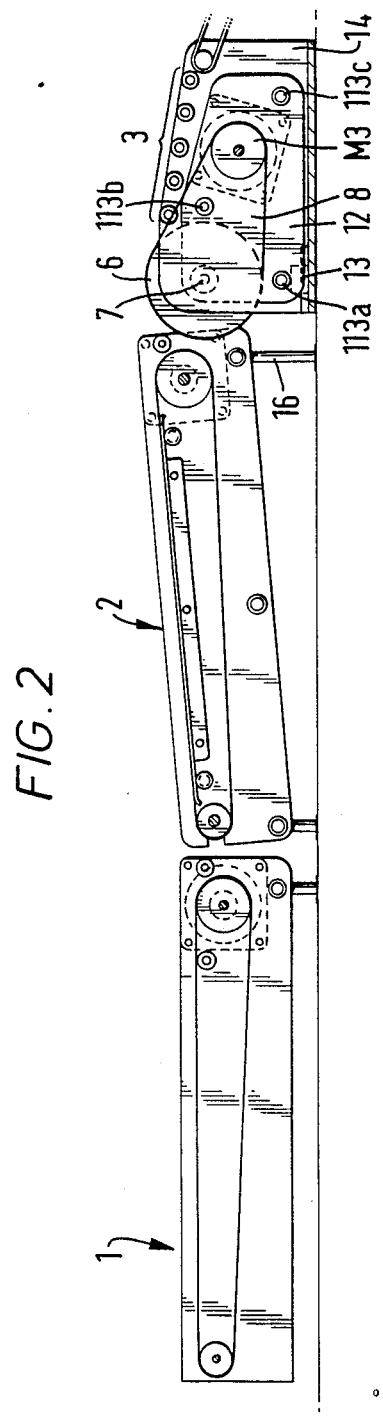
FIG. 2 is a side view of a weighing arrangement in accordance with one embodiment of the present invention.
Figure 3:
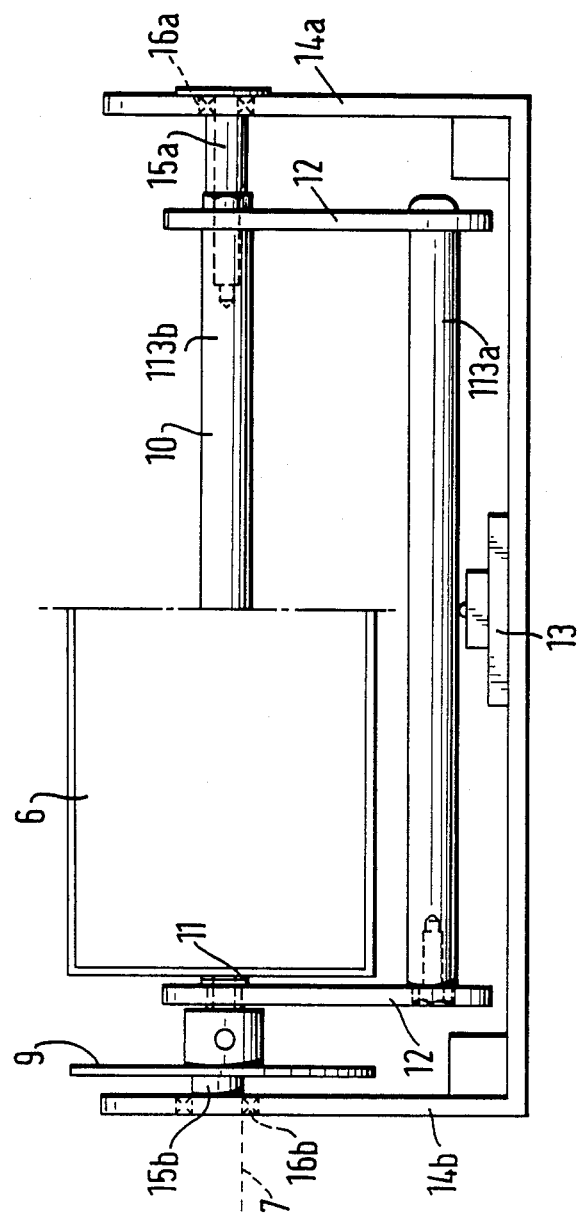
FIG. 3 is a partially cut away end view of the arrangement of FIG. 2.

The weighing apparatus 5 will now be described in more detail with reference to FIGS. 2 and 3. The second conveyor 2 is upwardly inclined at an angle of about 10° to the horizontal, but this is adjustable through legs 16. The third conveyor 3 is downwardly inclined by an angle of about 5°. The weighing apparatus 5 comprises a weight sensing component in the form of a cylinder 6 rotatable about its central longitudinal axis 7. A drive arrangement is provided to drive the cylinder 6 about its axis 7. Any suitable drive arrangement could be used, the illustrated embodiment including sprocketed chain drive 8 acting between the motor M3 and a drive wheel 9 secured to a shaft 10 of the cylinder 6. Other drive arrangements could take the form of an inverted motor arranged within the cylinder with a supported mounting shaft, or an axial cardan shaft arrangement for externally driving the cylinder. Preferably, the drive arrangement for the cylinder is independent of the drive arrangements M1, M2 for the first and second conveyors 1, 2. The drive shaft 10 of the cylinder 6 is rotatably supported by bearings 11 in two facing side pieces in the form of plates 12. The plates 12 are secured one to the other by three parallel rods 113a, 113b, 113c to form a frame. The frame is pivotally secured to facing support members 14a, 14b in a counter balanced manner by way of extension shafts 15a, 15b on rod 113b received by respective bearings 16a, 16b. Counterbalancing is achieved by the weight of the motor M3, the fulcrum of the system being along the axis of one of the rods 113b. The load sensing means 13 takes the form of a load cell. The pivotal mounting of the frame ensures that a load applied anywhere along the length of the cylinder 6 will give the same weight reading. It is also possible to provide two load cells, one at each end of the cylinder, in which case the total weight would be the sum of the sensed loads.

In use, an article is fed from the conveyor 2 to the cylinder 6 of the weighing apparatus 5. Operation of the weighing apparatus is based on the principle that as the article changes direction to be discharged via the downward conveyor 3 there is an instant at which the total mass of the article passes through its centre of gravity so as to act directly downwardly via the cylinder 6 on the load sensing means 13.

Figure 4:
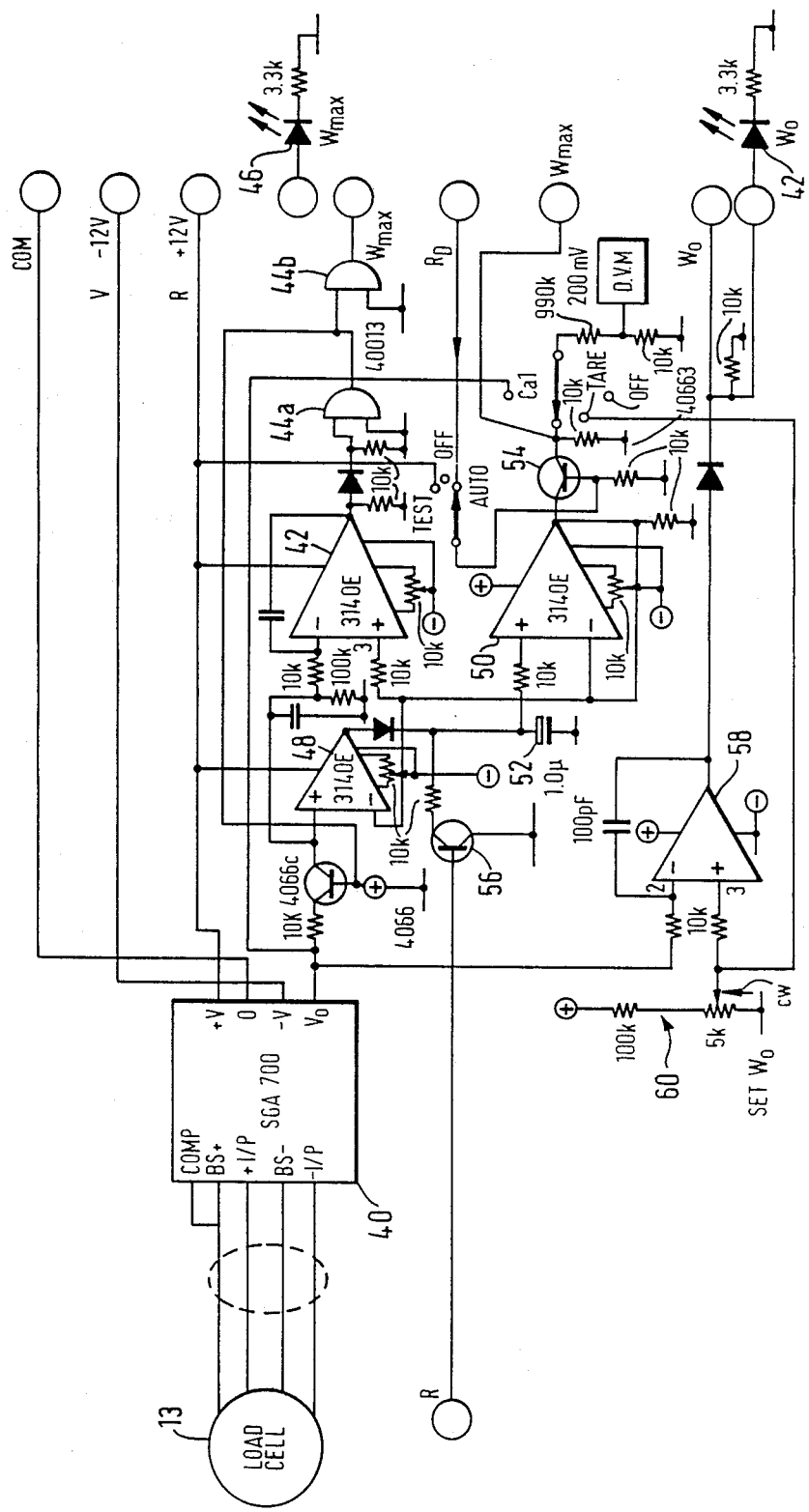
FIG. 4 is a circuit diagram of the circuitry associated with load sensing means.

The weight logic circuitry will now be described with reference to FIG. 4. The signal from the load sensing means 13 is passed to a strain gauge bridge amplifier 40, such as that illustrated SGA 700. The sensed load is there converted into a voltage Vo, for example at a conversion factor of 1 volt per kilogramme. The signal Vo is fed to circuitry for assessing the peak value of the signal and for storing that value for subsequent read out. As illustrated, a peak detector comprises a first operational amplifier 42 with associated components. When this detects a peak value of the output signal, this is supplied via inverting buffers 44a and 44b to activate a light emitting diode 46, thereby indicating when the peak weight Wmax has been detected. The peak value is stored by two further amplifiers 48, 50 connected with one (50) of the amplifiers acting as a voltage follower providing feedback to the other amplifier 48 to charge a capacitor 52 to the maximum detected value. The capacitor 52 ensures that this value is held to be read out as the output signal Wmax. Read-out is initiated by a read signal $R_D$ supplied to the gate transistor 24 thereby sampling and displaying the stored value.

A further gate transistor 56 receives a control signal R from the control logic 24 (FIG. 1) which discharges the capacitor 52 and thereby resets the circuit in readiness to receive the next weight value.

A weight zero setting arrangement includes a potential divider 60 and a further operational amplifier 58. A light emitting diode 62 is activated when zero weight is detected.

Figure 5:
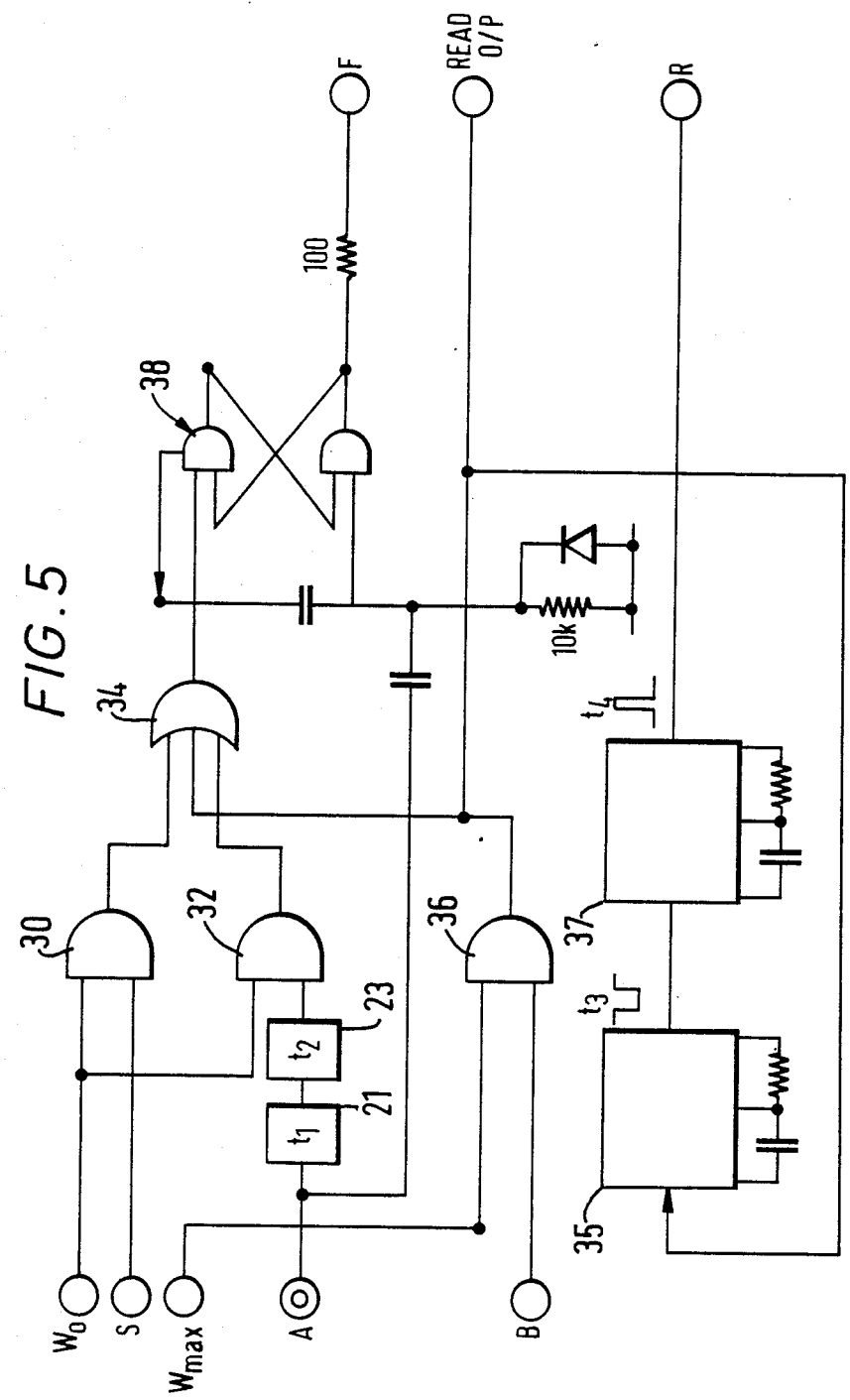
FIG. 5 is a circuit diagram of control circuitry for controlling the feed conveyor.

The control logic will now be described with reference to FIG. 5. With the circuitry illustrated, the algebraic logic for the system is as follows:

Wo='1' Weight Zero
Wo='0' Weight Off-Zero
A='1' Parcel waiting (end of feed conveyor)
B='1' Parcel rotating over cylinder 6 (Optional)
S='1' Start button
F='1' Feed conveyor - Run
F='0' Feed conveyor - Stop
$R_D$='1' Read output weight W max
R=1 Reset peak detector 42
Wmax=i Peak weight defined The weight zero signal Wo and start signal S are supplied to a first AND gate 30. The weight zero signal Wo is also fed to one input of a second AND gate 32, the other input of which receives the parcel waiting signal A via a delay device 21 and a pulse generator 23. The delay device 21 introduces a delay $t_1$ of about 3.5 seconds which is the approximate time taken for an article to travel from the article detection position at A to the weighing apparatus 5 (see FIG. 1). At the end of the delay $t_1$, a pulse is generated by pulse generator 23 with a pulse width $t_2$ of about 0.25 s (as small as possible). The outputs of AND gates 30, 32 feed an OR gate 34. A further AND gate 36 receives the maximum weight signal Wmax and, optionally, the parcel rotating signal B. If desired, the parcel rotating signal B can be set permanently to logic value "1". The output of this AND gate 36 is also supplied to the OR gate 34. The output of the OR gate 34 feeds a latch 38 the output of which is the feed signal F (FIG. 1) used to control the first conveyor 1. This logic is designed to implement the following criteria:

Criteria for operation of the feed conveyor 1 (FC=1)
Wo AND S=1
Wo AND A (as delayed by $t_1$)=1
Wmax AND B=1
Criteria for stopping the feed conveyor 1 (FC=0)
A=1 (pulse derived on arrival of next parcel)

The maximum weight signal Wmax when obtained triggers a read output signal $R_D$ and is also used to trigger production of the reset signal R via a delay device 35 and a pulse generator 37. The delay device 35 and pulse generator 37 cooperate in the same way as the earlier described similar combination of delay device 21 and pulse generator 23. The delay device 35 institutes a delay $t_3$ of about 2 seconds and then triggers production of a pulse of width $t_4$ equal to about 1 second. This defines the display time prior to resetting.

The times for the delays $t_1$ and $t_3$ are dependent on the length of the second conveyor 2. In the preferred embodiment, the length of the second conveyor is between 0.5 l and 1 , where l is the maximum expected parcel length. This assists in defining the point of inflexion and in obtaining a weight reading without risk of obstruction of the succeeding article. In this case, $t_1 \alpha$ 1.3 l and $t_3 \alpha$ 0.6 l . Articles of varying length can be accommodated economically since the control logic initiates feeding of subsequent particles when the peak load has been sensed.

Preliminary tests carried out on the prototype with a random set of parcels of varying size, weight and weight distribution indicate that an accuracy with a mean error of approximately 0.5% and a maximum error of 1% should be achievable with an arrangement as described above.

In a practical embodiment employing a microprocessor system for data logging, facilities may be incorporated within the software to provide check totals to improve data integrity. Similarly the sequencing of the various machine control functions and peak detection would also be included in the software as opposed to the discrete circuit elements described above.

What is claimed is:

1. A method of weighing an article in a conveyor system, the method comprising the steps of supplying an article to the conveyor system;
driving said conveyor system to cause said article to travel over a load bearing component arranged to receive such articles and to balance momentarily each article along a line of contact transverse to the movement of the article as it passes over the load bearing component so that substantially the total weight of the article momentarily acts on the load bearing component;
measuring the weight of the article on the load bearing component; and
measuring the peak weight value of the article.

2. A weighing arrangement comprising:
a conveyor system incorporating a load bearing component arranged in the path of an article on the conveyor system, the load bearing component being comprised of a cylindrical body mounted for rotation about an axis thereof, and said load bearing component being arranged to balance the article as it passes over the load bearing component so that substantially the total weight of the article momentarily acts on the load bearing component; and
load sensing means coupled to the load bearing component for measuring said total weight.

3. An arrangement as claimed in claim 2, wherein the cylindrical body is rotatably mounted between two facing side pieces which extend substantially perpendicularly to said axis and which are pivotably mounted relative to a support member in such a way that they can pivot relative to the support member about an axis extending parallel to said axis of rotation.

4. An arrangement as claimed in claim 2, in which the cylindrical body is provided with drive means for causing rotation about said axis.

5. A method of weighing an article in a conveyor system, the method comprising the steps of:
   supplying an article to the conveyor system;
   driving said conveyor system to cause said article to travel to a load bearing component, said load bearing component including a cylindrical body mounted for rotation, and said load bearing component being arranged to receive such articles and to balance such article as they pass over the load bearing component so that substantially the total weight of the article momentarily acts on the load bearing component;
   driving the load bearing component at a rotational rate such that the speed of its surface is approximately equal to the surface speed of a supply portion of the conveyor system; and
   measuring the peak weight value of the article.

6. A method as claimed in claim 5 in which the load bearing component and the supply portion are driven separately.

7. A weighing apparatus comprising
   a conveyor system incorporating a load bearing component and means for passing an article to be weighed over the load bearing component so that the load bearing component momentarily balances the article along a line of contact transverse to the movement of the article, momentarily to carry substantially the total weight of the article,
   load sensing means coupled to the load bearing component for measuring the weight of the article on the load bearing component, and
   circuitry for the load sensing means to measure the peak weight value of each successive article.

8. A weighing apparatus as claimed in claim 7, in which the load bearing component comprises a cylindrical body mounted for rotation about its axis.

9. A weighing apparatus as claimed in claim 8, in which the cylindrical body is rotatably mounted between two facing side plates which extend substantially perpendicularly to said axis and which are pivotally mounted relative to a support member in such a way that they can pivot relative to the support member about an axis extending parallel to the axis of rotation.

10. A weighing apparatus as claimed in claim 8, in which the cylindrical body is provided with drive means for causing rotation about said axis.

11. An arrangement as claimed in claim 10, in which said circuitry is arranged to initiate, in response to assessing when the peak weight has been sensed by the load sensing means, feeding of the next article to the conveyor system.

* * * * *

UNITED STATES PATENT AND TRADEMARK OFFICE
CERTIFICATE OF CORRECTION

PATENT NO. : 4,967,857
DATED : November 6, 1990
INVENTOR(S) : Kent Graham, et al.

It is certified that error appears in the above-identified patent and that said Letters Patent is hereby corrected as shown below:

Column 6, delete "0.5l and 1, where 1" and insert --0.5$\ell$ and $\ell$, where $\ell$ --.

Column 6, line 17 & 18 delete "t$_1$∝1.3*l* and t$_3$ 0.6*l*" and insert --t$_1$∝1.3$\ell$ and t$_3$∝0.6$\ell$--

Signed and Sealed this

Twenty-first Day of July, 1992

Attest:

DOUGLAS B. COMER

Attesting Officer

Acting Commissioner of Patents and Trademarks